United States Patent [19]

Miike et al.

[11] Patent Number: 4,831,529
[45] Date of Patent: May 16, 1989

[54] MACHINE TRANSLATION SYSTEM

[75] Inventors: Seiji Miike, Yokohama; Noriko Yamanaka, Fujisawa; Hideki Hirakawa, Kawasaki; Shinya Amano, Yokohama, all of Japan

[73] Assignee: Kabushiki Kaisha Toshiba, Kawasaki, Japan

[21] Appl. No.: 13,884

[22] Filed: Feb. 12, 1987

[30] Foreign Application Priority Data

Mar. 4, 1986 [JP] Japan .................... 61-45215

[51] Int. Cl.⁴ ............................................ G06F 15/38
[52] U.S. Cl. ..................................... 364/419; 364/900
[58] Field of Search ............... 364/200, 900, 419; 434/156-157; 400/110

[56] References Cited

U.S. PATENT DOCUMENTS

| | | | |
|---|---|---|---|
| 4,412,305 | 10/1983 | Yoshida | 364/419 |
| 4,468,756 | 8/1984 | Chan | 364/900 |
| 4,542,478 | 9/1985 | Hashimoto | 364/900 |
| 4,654,798 | 3/1987 | Taki | 364/419 |
| 4,661,924 | 4/1987 | Okamoto | 364/900 |
| 4,674,065 | 6/1987 | Lange | 364/518 |
| 4,685,060 | 8/1987 | Yamano | 364/900 |

FOREIGN PATENT DOCUMENTS

| | | |
|---|---|---|
| EP-A-0012777 | 12/1978 | European Pat. Off. |
| EP-A-0081784 | 12/1982 | European Pat. Off. |
| 0074069 | 4/1986 | Japan . |
| 0018072 | 6/1986 | Japan . |

OTHER PUBLICATIONS

Research, Scie. & Applic. Industry, vol. 10, No. 3, Oct. 1957, pp. 383-389, I. K. Belskaja: "Machine Translation of Languages": p. 384, col. 1, line 50-p. 385, col. 2, line 50.

Primary Examiner—Charles E. Atkinson
Assistant Examiner—Gail O. Hayes
Attorney, Agent, or Firm—Foley & Lardner, Schwartz, Jeffery, Schwaab, Mack, Blumenthal & Evans

[57] ABSTRACT

A machine translation system having input means having different function keys, edit keys, cursor keys as well as having normal character keys and numeric keys, for performing various functions for translation, edit control means for controlling the edition operation of the system, translation means coupled to the edit control means, for executing the translation processing in accordance with control signals from the edit control means, and dictionary means having at least a first dictionary for storing various words in various parts of speech in a first language and their translation in a second language corresponding to the words in the first language, and a second dictionary for storing various terminology in noun in the second language corresponding to the words in the first language as well as storing various grammars for the analysis of the languages with this constriction, the meaning of particular kinds of the parts of speech other than a noun takes precedence of the meaning of the Noun when determining words and idioms to be picked up from the first dictionary and when same terminology as a noun as that stored in the first dictionary is found in the second dictionary, the meaning of the terminology in the second dictionary takes precedence of the meaning of that stored in the first dictionary when producing the translated sentences, thereby performing a correct translation in high speed.

9 Claims, 5 Drawing Sheets

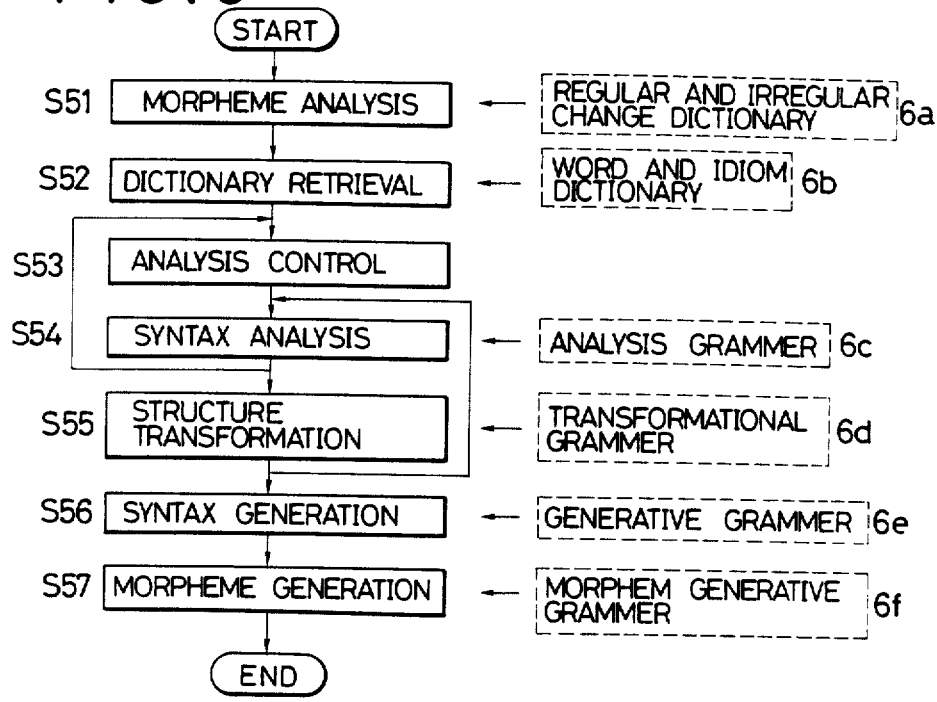
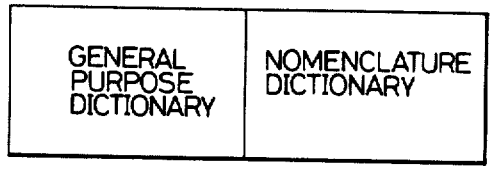

FIG. 9

| GENERAL PURPOSE DICTIONARY ||| NOMENCLATURE DICTIONARY |||
|---|---|---|---|---|---|
| WORD | PARTS OF SPEECH | TRANSLATION | WORD | PARTS OF SPEECH | TRANSLATION |
| STORE | VERB | CHIKUSEKISURU | STORE | NOUN | MEMORY |
| STORE | NOUN | SHOP | | | |

| RESULT OF RETRIEVAL |||
|---|---|---|
| WORD | PARTS OF SPEECH | TRANSLATION |
| STORE | VERB | CHIKUSEKISURU |
| STORE | NOUN | MEMORY, SHOP |

FIG. 11

A
- The system has a large store.
- (a) そのシステムは大型の店を有する     × (GENERAL PURPOSE DICTIONARY)
- (a)' そのシステムは大型の記憶装置を有する  ○

B
- (b) The system stores values.
- (SENTENCE STRUCTURE ANALYSIS FAILED)  × (NOMENCLATURE DICTIONARY)
- (b)' そのシステムは値を蓄積する     ○

MACHINE TRANSLATION SYSTEM

BACKGROUND OF THE INVENTION (1) The present invention relates to a machine translation system for performing correct and speedy translation by the use of a plurality of different types of dictionaries for translation.

(2) Description of the Prior Art

Much attention has been paid to automatic machine translation systems of input original documents written in a first language into a second language by the use of a computer, of late. In these machine translation systems, the input original sentences are analyzed in view of each morpheme and its morphological construction as well as syntax, and divided into predetermined units for processing of words, phrases, or idioms. Then, a dictionary or dictionaries for translation are searched and each word is retrieved from the dictionary for every processing unit of the words and phrases thus divided, and when the corresponding words and phrases in the second language, i.e., translated words and phases are found in the dictionary, they are finally combined in accordance with predetermined translation rules and grammars, thereby obtaining their translated sentences.

In such translation systems as described above, it is normal to use a plurality of different dictionaries, e.g., a general purpose dictionary and a nomenclature dictionary in order to translate complicated natural languages, which human beings use as well as to produce desired translation including terminology which users of the system want.

The general purpose dictionary indicates the one into which words of all of possible parts of speech in the first language and their translated counterparts in the second language, consisting of the each of words and idioms, have been stored. Accordingly, when analyzing the syntax of the first language possible parts of speech are in turn determined, thus succeeding in the analysis in an early stage of search. However, since only standard words and phrases or idioms have been stored in the general purpose dictionary in view of translation, a good translation of the original cannot be expected.

In the nomenclature dictionary, since specific translated words and phrases, i.e., mostly terminology of nouns in each of particular fields have been stored therein, translated senses in good quality can be expected. However, since for the most part only nouns among the parts of speech have been stored in the nomenclature dictionary, the analysis of syntax often tends to.

Now, among the methods of retrieving words and idioms from a plurality of dictionaries for translation, there has been proposed heretofore a method of retrieving the parts of speech and phrases successively. In this method, however, as the intelligence and information to be used for the translation processing, those dictionaries including the parts of speech and translated words and idioms have a higher priority in the translation processing with respect to the contents of the dictionary for translation in the former dictionary, than those in the latter dictionary.

Since both the general purpose dictionary and the nomenclature dictionary alike have both merits and demerits described above, there was the drawback that even if any one of the two dictionaries was preferentially used for the retrieval of certain words and idioms, it could not sufficiently deal with the translation processing of various original documents.

For example, when the general purpose dictionary is given a higher priority than the nomenclature dictionary, an original sentence written in English for instance, which reads "The system has a large store." is translated into a Japanese sentence which reads "Sono shisutemu wa ogata no mise o yusuru." as the result of the retrieval of noun "mise (shop)" instead of "Kiokusochi (memory)". In this case, the translated sentence is grammatically correct but it is not at all a correct translation in its true meaning because it is a maltranslation.

On the other hand, when the nomenclature dictionary is given a higher priority than the general purpose dictionary, the original in English which reads "The system stores values." can not also be correctly translated into a correct Japanese sentence, because the nomenclature dictionary contains for the most part only nouns so that the translated Japanese may become somewhat "Sono shisutemu no kiokusochi no atai" as the result of the interpretation of a series of nouns, thereby failing to analyze its syntax.

Since an operator has to correct the translation errors by looking at sentences on a display of a machine translation system according to the prior art, it will take much time before correct sentences will be finally obtained finally.

For these reasons, a machine translation system has long been desired, wherein translated sentences can be obtained rapidly but in good quality by the effective use of both the general purpose and nomenclature dictionaries, as well as by controlling the priority orders of the two kinds of the dictionaries in accordance with the contents of the original in view of the parts of speech and terminology as well, used in the original to be translated.

SUMMARY OF THE INVENTION

It is therefore an object of the present invention to provide an improved machine translation system in which translated sentences in good quality can be obtained rapidly by the effective use of information contained in both the general purpose and nomenclature dictionaries.

It is another object of the present invention to provide an improved machine translation system in which the priority order of at least two kinds of dictionaries to be used is determined in accordance with the kinds of parts of speech and the contents of information used in the original as well as the conditions of the two dictionaries.

It is still another object of the present invention to provide an improved machine translation system in which a suitable translation can be obtained promptly without necessitating the post edition of the translation, otherwise necessary, by simplifying the edit operation.

One feature of the present invention resides in a machine translation system for translating a first language into a second language, which comprises: input means having function keys, edit keys, cursor keys for entry of the original written in the first language and for performing various operations for translation, as well as having other alphanumeric keys; a first memory for storing original sentences written in the first language so as to analyze the original sentences; a second memory for storing the translated sentences in the second language as a translation corresponding to the input original in the first language; edit control means for controlling the edition operation of the entire system; translation means coupled to the edit control means for executing the translation processing in accordance with control signals from the edit control means; dictionary means having at least a first dictionary for storing various words in various parts of speech and their translation in the second language respectively corresponding to the words in the first language, and a second dictionary for storing various terminology in noun in the second language corresponding to the words in the first language, as well as storing various grammars for the analysis of the first and second languages; and display means having display control means, for displaying both the original sentences and the translated sentences on the display surface.

Another feature of the present invention resides in the machine translation system wherein the meanings of particular kinds of parts of speech other than noun takes precedence of the meaning of noun when determining words or idioms to be picked up from the first dictionary by the translation means and when same terminology in noun as that stored in the first dictionary is found in the second dictionary, the meaning of the terminology in the second dictionary takes precedence of the meaning of that in the first dictionary.

These objects, features and advantages of the invention will be better understood from the following detailed description of the invention with reference to the accompanying drawings.

BRIEF DESCRIPTION OF DRAWINGS

FIG. 5 shows a control flow chart of the translation processing performed by the translation means, FIG. 6 shows dictionary means having general purpose and nomenclature dictionaries, FIG. 9 shows the contents of the general purpose and nomenclature dictionaries to be retrieved, in accordance with the machine translation system according to the present invention, by way of example, FIG. 10 shows the result of the retrieval according to the translation system, by way of one example, and FIGS. 11A and B are examples of the result of translation performed by the machine translation system according to the present invention.

DESCRIPTION OF THE PREFERRED EMBODIMENT

Figure 1:
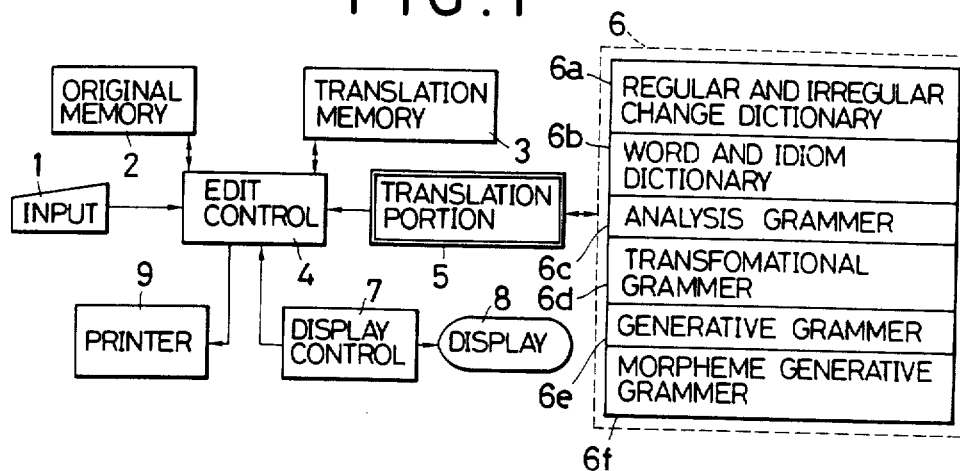
FIG. 1 is a construction of an overall machine translation system according to one embodiment of the present invention.

Referring to FIG. 1, the machine translation system according to the present invention comprises an input portion 1 which may be a keyboard, an original memory portion 2 for storing sentences of the original written in a first language, input by the keyboard, a translation memory portion 3 for storing the translated sentences in a second language corresponding to the input original in the first language, an edit control portion 4 for controlling the entire system, a translation portion 5 for performing translation processing, translation dictionary means 6 inncluding the general purpose and nomenclature dictionaries, which contains various grammars as well as words, idioms, and expressions for use in the translation processing, a display control portion 7 for controlling the display of various sentences including the original and its translated sentences, a display 8, and a printer portion 9 for printing the original sentences and their translated sentences displayed on the display 8 and for outputting the translated sentences. In this machine translation system, if an English-Japanese translation should be performed, the first language is English and the second language is Japanese.

Figure 2:
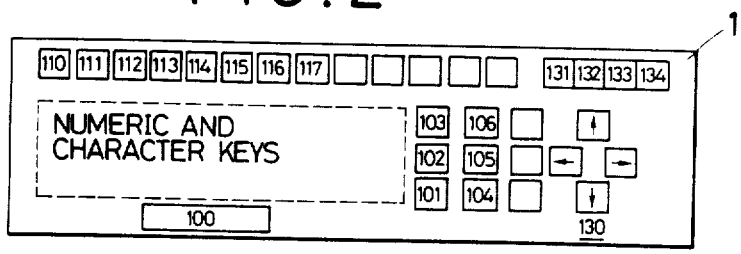
FIG. 2 is the arrangement of various keys provided on the input means of the system of FIG. 1.

FIG. 2 shows one example of the arrangement of keys of a key board of the input portion 1, according to the present invention. The key board comprises the following different keys in addition to the normal alphanumeric keys;

a key 100 indicates a translation instruction key,
keys 101 through 106 indicate edit keys,
keys 110 through 117 indicate function keys,
keys 130 through 134 indicate cursor keys, and
other keys.

Figure 3:
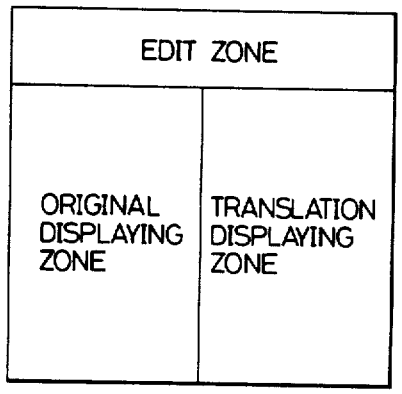
FIG. 3 is one example of the lay-out of the display zones in the display surface of the display means.

FIG. 3 shows one example of the lay-out of the display surface of the display portion 8. The original sentences in the first language are to be displayed on the left side zone of the display while the translated sentences in the second language are to be displayed on the right side zone of the display. These zones are located under the edit zone which is located in the upper portion of the display, on which information necessary for performing different editions is displayed.

Figure 4:
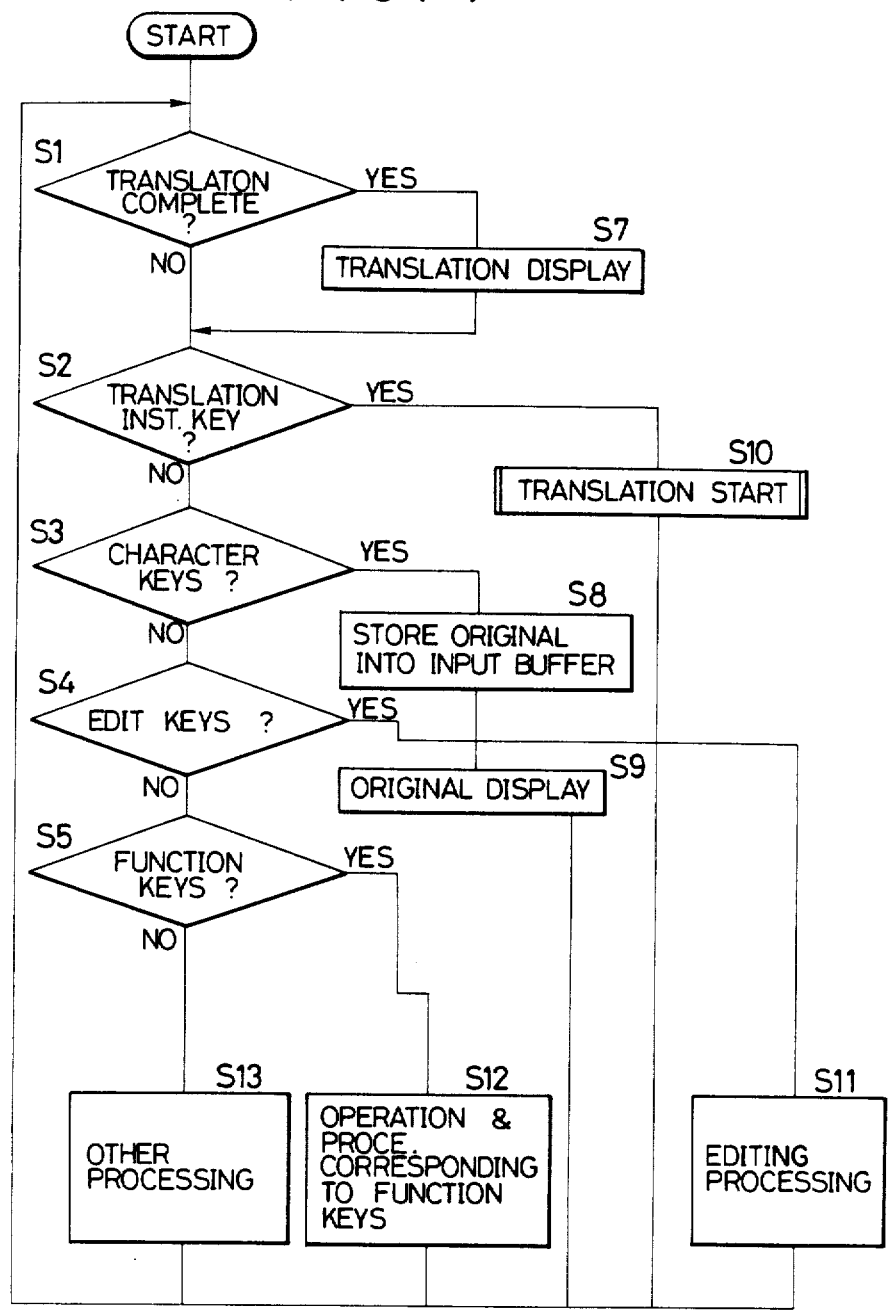
FIG. 4 is a control flow chart of the edit control operation and processing performed by the edit control means.

FIG. 4 shows a control flow chart of a dialogue translation processing performed by the edit control portion 4. In the dialogue translation processing, an operator can conveniently carry out the edition work of the translated sentences corresponding to the original sentences.

In the control flow chart, the edit control portion 4 monitors if any input of information has been done by the key board of the input portion 1 or any translation completion signal from the translation portion 5 has been received in steps $S_1$ to $S_5$. If the result of the monitoring is YES, i.e., any key input has been provided, the corresponding operation is carried out.

When the operator operates any function key, this condition is detected in step $S_5$ and the operation corresponding to the function keys is carried out in step $S_{12}$.

When the operator operates any edit key, this condition is detected in step $S_4$ and the edit operation corresponding to the edit keys is carried out in step $S_{11}$.

When the operator operates the cursor key 130 or any of other control keys the corresponding operation for moving the cursor and other processing are performed in step $S_{13}$ in accordance with the operation of keys.

When the original sentences are input by the operator by the operation of character keys, this condition is detected in step $S_3$, the characters corresponding to the operation of particular keys are stored in an input buffer (not shown) within the edit control portion 4 successively in step $S_8$. These original sentences are displayed on the original display zone on the display portion 8 through the display control portion 7 in step $S_9$.

When the operator operates the translation instruction key 100 when entry of one sentence for instance has been completed, this condition is detected in step $S_2$ and the original sentence stored in the input buffer is applied to the translation portion 5 by the edit control portion 4, so as to start the translation processing in step $S_{10}$. In this case, when it is necessary to perform any editions such as correction, insertion, deletion of a word or words or phrase during the entry of the original, it can be carried out by the operation of the correction key 101, the insertion key 102, or the deletion key 103 after moving the cursor to a desired edit position by the operation of the cursor keys 130.

More particularly, after start of the operation, a first determination is carried out in step $S_1$ as to whether the translation is completed. If the result of the determination is NO, the operation now moves to step $S_2$ where a decision is made as to whether the translation instruction key 100 is operated. If the result of the decision in step $S_2$ is YES, the operation goes to step $S_{10}$ where translation is started. However, if the result of the decision in step $S_2$ is NO, the operation goes to step $S_3$ where another decision is made regarding the character keys, i.e., alphanumerics keys being operated. If the result of this decision is YES, the operation moves to step $S_8$ where the original is stored in the input buffer not shown. On the other hand, if the result of decision in step $S_3$ is NO, the operation now moves to step $S_4$ where another decision is made as to whether any of the edit keys 101 to 106 is operated. If the result of the decision is YES, the operation now goes to step $S_{11}$ where the edit processing is carried out, corresponding to each key operated with respect to a particular word or phrase which is being indicated by the cursor.

For instance, when the insertion key 102 is operated in this case, any desired character is inserted before the position of the cursor while when the deletion key 103 is operated, a character or a series of characters indicated by the cursor is deleted. In the same manner, when the movement key 104 is operated, characters indicated by the cursor are moved from one place to the other. When the cancel key 105 is operated, the effect of the operation of any of the keys 101, 102, 103 is cancelled. When a candidate key 105 is operated, an associated character candidate other than the word or phrase indicated by the cursor is indicated.

Returning to step $S_4$, if the result of the decision in step $S_4$ is NO, the operation now moves to step $S_5$ where another decision is made as to whether any of the function keys 110 to 117 is operated. If the result of the decision is YES, the operation goes to step $S_{12}$ where various processings corresponding to any of the function keys operated are carried out. For instance, when the translation display key 110 is operated, the translated sentence or sentences are displayed on the display portion 8. When the dictionary display key 111 is operated, a partial content of either the general purpose dictionary or the nomenclature dictionary corresponding to the words or phrase of the original can be indictated on the display portion 8.

When the dictionary registration key 112 is operated, new words or idioms can be registered. When the dictionary deletion key 113 is operated, certain words or idioms which have been registered can be cancelled or deleted. When the partial translation key 114 is operated, a partial translation can be displayed on the display portion 8, for correction, for instance.

The cursor keys consists of keys 130 for moving the cursor in the upward, downward, right and left directions, respectively, the unit change key 131 for changing the unit for moving the cursor, the display zone movement keys 132 for moving the cursor between the display zones, the enlargement key 113 for enlarging the size of the cursor into word unit, and the reduction key 134 for reducing the size of the cursor into a character unit.

Now, returning to step $S_1$, if the result of the decision in step $S_1$ is YES, the operation moves to step $S_7$ where the edit control portion 4 supplies translated sentence candidates and auxiliary information obtained from the translation portion 5 to the display control portion 7, so as to display the best translated sentences among the candidates.

The display control portion 7 indicates the translated sentence candidates in the translation display zone corresponding to that of the original which is displayed on the left side, as well as displaying them with high brightness when the auxiliary information exists, so that the operator can well identify the translated sentences.

In the manner as described, the operator of the machine translation system according to the present invention can obtain the translated sentences dialoguing with the system while conveniently carrying out the edition processing of the translated sentences.

FIG. 5 shows a control flow chart of the translation processing in the translation portion 5.

After start of the operation, in the morpheme analysis section $S_{51}$, words each having inflection are transformed into each of their basic forms by use of a regular and irregular change directionary 6a with respect to the input original.

In the dictionary retrieving section $S_{52}$, each of words, phrase, and idioms are retrieved from the original sentences and parts of speech are picked up by the use of a word and idiom dictionary 6b.

In the analysis control section $S_{53}$, each candidate of translation is applied to a syntax analysis section $S_{54}$.

In the syntax analysis section $S_{54}$, the syntax of each candidate of translation is analyzed by using an analysis grammar 6c and analyzed structure elements are picked up. If the analysis is not successful, the operation returns to the analysis control section $S_{53}$.

In the structure transformation section $S_{55}$, the structure of the first language, i.e., English language in this case, is transformed into the second language, i.e., Japanese language in this case, by using a transformational grammer 6d. If the transformation is not successful, the operation now returns to the syntax analysis section.

In the syntax generation section $S_{56}$, the word order or word sequence of the second language, i.e., the Japanese language is determined from the structure of the Japanese language in accordance with a generative grammar 6e and the word order is arranged in accordance with the generative grammar.

In the morpheme generation section $S_{57}$, the ending of each word is changed by using a morpheme generative grammar 6f, so as to complete each of the translated sentences.

Each of the above sections produces each signal to the edit control portion 4 when starting the processing thereof.

Description will now be made about the processing of the priority order of the contents between the general purpose dictionary and the nomenclature dictionary in the machine translation system thus constructed.

FIG. 6 shows dictionary means consisting of the two kinds of the dictionaries, i.e., the general purpose and nomenclature dictionaries into which various words, phrases and idioms having each of particular parts of speech have been stores.

Figure 7:
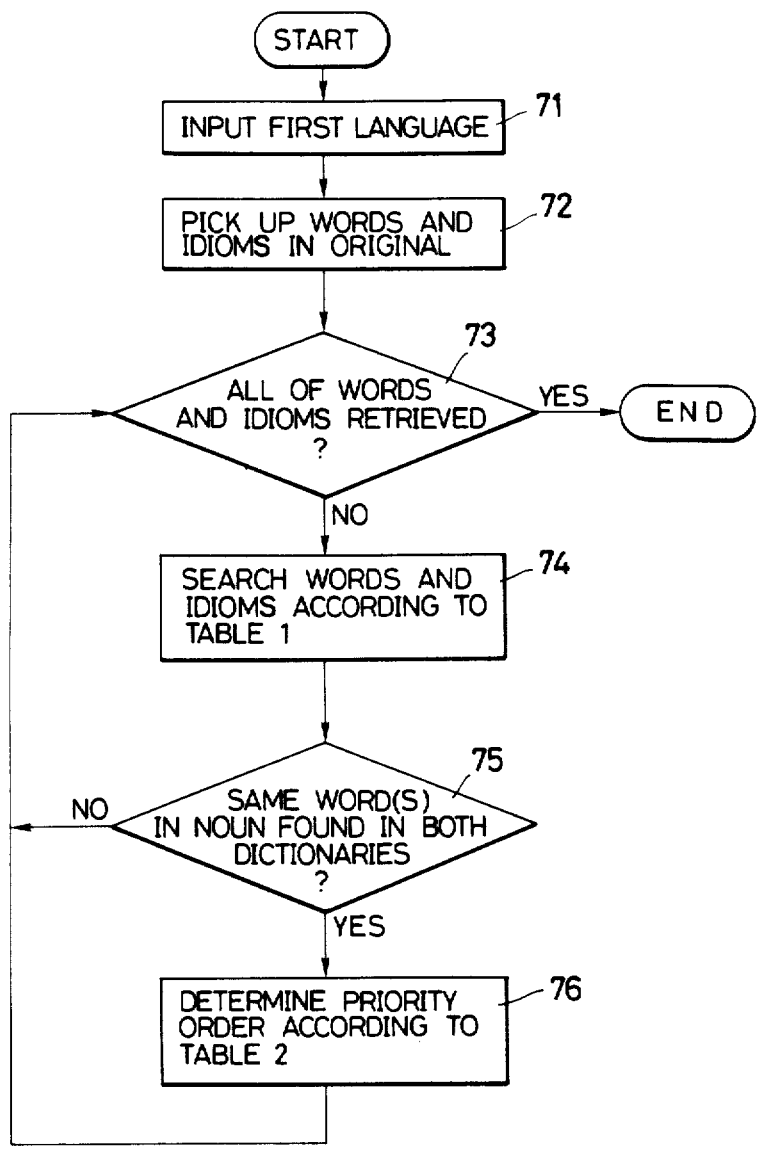
FIG. 7 is a control flow chart of the retrieval processing of words and terminology of the translated sentence so as to decide the priority order thereof in accordance with tables 1 and 2 in FIG. 8, FIGS. 8 and (a) and (b) show each of the priority tables to be used in the control flow chart of FIG. 7.

FIG. 7 shows a control flow chart of the dictionary retrieval section in step $S_{52}$. Supposing now that the first language is English and the second language is Japanese, English sentences to be translated are firstly input in the system by the input portion 1 of FIG. 1, in step 71 and the operation goes to step 72 where each of the words and idioms in the English sentences are separated by the edit control portion 4. After this operation, it now moves to step 73 where a decision is made as to whether all of the words and idioms in the English sentences are retrieved. If the result of the decision is YES, the operation terminates. However, if the result of the decision in step 73 is NO, the operation now moves to step 74 where each of the words and idioms thus retrieved are searched in accordance with the priority order table 1 indicative of a higher priority given to the parts of speech than the content of translation of the words and idioms between the general purpose and nomenclature dictionaries as shown in FIG. 8(a). Namely, the search and retrieval of the words and idioms are carried out firstly by the general purpose dictionary and then by the nomenclature dictionary. After this operation, it moves to step 75.

In the step 75, another decision is made as to if same part of speech, for instance, same word or words of noun exists among the words and idioms thus retrieved in the dictionaries. If the result of the decision is NO, the operation returns to step 73. On the other hand, however, if the result of the decision in step 75 is YES, the operation now goes to step 76 where the priority order of the translated words is determined in accordance with the table 2 of the translated word priority order shown in FIG. 8(b). Namely, same word or words in noun exists both in the general purpose dictionary and the nomenclature dictionary, the translated word or words is selected respectively by the nomenclature dictionary having the higher priority in the case of noun, in step 76. In short, when same word or words is found in the two dictionaries, if the word is verb, the meanings in the general purpose dictionary have a higher priority than that of the general dictionary while if it is noun, the meaning in the nomenclature dictionary have a higher priority than the former.

The retrieval processing will be described in more detail by way of the following example.

Supposing that the English word "store" having various meanings has been stored both in the general purpose dictionary 91 and the nomenclature dictionary 92 as shown in FIG. 9, the retrieval of the English word "store" from the two dictionaries is performed in the following manner in accordance with the tables 1 and 2 shown in FIG. 8. When the same word as a noun is found both in the general purpose dictionary 91 and in the nomenclature dictionary 92, the terminology in the nomenclature dictionary 92 takes precedence of that in the general purpose dictionary 91 after retrieving the verb "store" and the result of the retrieval is arranged as shown in FIG. 10.

Accordingly, when the English sentence "The system has a large store" is to be translated into Japanese, determination relating to other of parts of speech, for instance, "store" as a verb takes precedence of the noun and then the terminology in the nomenclature dictionary 92 takes precedence of the general purpose dictionary 91 when the terminology in question are both found in the two dictionaries. As a result, the meaning of "store" as a noun is picked up from the nomenclature dictionary 92, which has a meaning almost equal to "memory", instead of "shop" so that the syntax analysis will be successful, thereby obtaining a correct Japanese sentence which reads "Sono shisutemu wa ōgata no kiokusōchi o yusuru." as shown in FIG. 11A(a'), instead of the maltranslation "Sono shisutemu wa ōgata no mise o yusuru." as shown in FIG. 11A(a).

Let us take another example. When the English sentence "The system stores values" is to be translated into Japanese, the syntax analysis or sentence structure analysis will succeed if the meaning of the verb "store" takes precedence of that of the noun, according to the present invention. Namely, the meaning of the English word as a verb "store" which is equal to "chikuseki suru" in Japanese, is firstly picked up from the general purpose dictionary 91 and then "system" and "value(s)" both as noun are picked up from the nomenclature dictionary 92. As a result, the correctly translated Japanese sentence "Sono shisutemu wa fukusūo atai o chikuseki suru." can be obtained, as shown in FIG. 11B(b').

On the other hand, if the meaning of the word as a verb fails to take precedence of the same word as a noun, the analysis of the English sentence is not successful and a maltranslation will be obtained, which may read, for instance, "Sono shisutemu no kiokusochi no atai.", as shown in FIG. 11B(b).

As described in the foregoing embodiment according to the present invention, each particular kind of parts of speech used in the first language to be translated takes precedence of each of the words as a noun and terminology in the nomenclature dictionary, if it is a noun, takes precedence of the terminology in the general purpose dictionary when same word as a noun exists in both of the two dictionaries. Accordingly in the first case above, a word or words which is other than a noun, e.g., a verb is retrieved from the general purpose dictionary.

As a result, in the machine translation system according to the present invention, the speed of the generation of correctly translated sentences can be strikingly improved compared with the prior art in which either the nomenclature dictionary or the general purpose dictionary is firstly retrieved and then the other follows.

In the foregoing embodiment according to the present invention, the description has been made about the machine translation system using only two dictionaries, i.e., general purpose and nomenclature dictionaries. It is however apparent that more than two dictionaries may be used as the case may be.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A machine translation system for translating a first language into a second language, which comprises:
   input means for entry of an original written sentence in the first language into the system;
   dictionary means having at least a first dictionary for storing various words in various parts of speech and their translation in the second language respectively corresponding to the words in the first language, and a second dictionary for storing various words designated as nouns corresponding to words in the first language;

translation means for analyzing the original written sentence in the first language, for retrieving said dictionary means and for executing the translation processing of the input original, when any same word designated as nouns stored in the first dictionary is found in the second dictionary, the word stored in the second dictionary takes precedence over that in the first dictionary in the translation means; and output means for producing translated sentences in the second language obtained from said translation means.

2. The machine translation system as claimed in claim 1 wherein said first language is English and said second language is Japanese.

3. A machine translation system for translating a first language into a second language, which comprises:
   (a) input means (1) having function keys, edit keys, cursor keys for entry of an original written in the first language and for performing various operations for translation, as well as having other alphanumeric keys;
   (b) a first memory (2) for storing original sentences written in the first languages so as to analyze the original sentences;
   (c) a second memory (3) for storing translated sentences in the second language as a translation corresponding to the input original sentences in the first language;
   (d) edit control means (4) for controlling the edition operation of the entire system;
   (e) translation means (5) coupled to said edit control means for executing the translation processing in accordance with control signals from said edit control means;
   (f) dictionary means (6) having at least a first dictionary (91) for storing various words in various parts of speech and their translation in the second language respectively corresponding to the words in the first language, and a second dictionary for storing various words designated as nouns in the second language corresponding to the words in the first language, as well as storing various grammars for the analysis of the first and second languages;
   (g) display means (8) having display control means (7), for displaying both the original sentences and the translated sentences on the display surface.

4. The machine translation system as claimed in claim 3 wherein said first dictionary for storing various words in various parts of speech and their translation in the second language is a general purpose dictionary and said second dictionary for storing various words designated as nouns in the second language is a nomenclature dictionary.

5. The machine translation system as claimed in claim 4 wherein the first language is English language and the second language is Japanese language.

6. The machine translation system as claimed in claims 4 or 5 wherein the meanings of particular kinds of parts of speech other than noun takes precedence of the meaning of noun when determining words or idioms to be picked up from the first dictionary by translation means and when same terminology in noun as that stored in the first dictionary is found in the second dictionary, the meaning of the terminology in the second dictionary takes precedence of the meaning of that in the first dictionary.

7. The machine translation system as claimed in claim 6 wherein one of said particular kinds of parts of speech is a verb.

8. The machine translation system as claimed in claim 4 wherein the display surface of said display means is divided into at least three displaying zones which consist of an edit zone in the upper portion, an original sentence display zone in the left half under the edit zone, and a translation display zone in the right half under the edit zone, of the display means.

9. The machine translation system as claimed in claim 4 wherein the system further comprises a print portion (9) for printing and outputting each translation as a hard copy.

* * * * *